US011533093B2

(12) United States Patent
Lee et al.

(10) Patent No.: US 11,533,093 B2
(45) Date of Patent: Dec. 20, 2022

(54) APPARATUS AND METHOD FOR TRANSMITTING AND RECEIVING INFORMATION AND POWER IN WIRELESS COMMUNICATION SYSTEM

(71) Applicant: Industry-Academic Cooperation Foundation, Yonsei University, Seoul (KR)

(72) Inventors: Jang-Won Lee, Seoul (KR); Hyun-Suk Lee, Seongnam-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 16/727,354

(22) Filed: Dec. 26, 2019

(65) Prior Publication Data
US 2020/0336185 A1  Oct. 22, 2020

(30) Foreign Application Priority Data
Apr. 18, 2019  (KR) .......................... 10-2019-0045566

(51) Int. Cl.
  *H03D 3/22* (2006.01)
  *H04B 7/06* (2006.01)
  *H04B 7/185* (2006.01)
  *H04B 7/0417* (2017.01)
(52) U.S. Cl.
  CPC ......... *H04B 7/0617* (2013.01); *H04B 7/0417* (2013.01); *H04B 7/0639* (2013.01); *H04B 7/18545* (2013.01)
(58) Field of Classification Search
  CPC .. H04B 7/0617; H04B 7/0417; H04B 7/0639; H04B 7/18545

USPC .................. 375/329, 322, 316, 295, 219
See application file for complete search history.

(56) References Cited

U.S. PATENT DOCUMENTS

| | | | |
|---|---|---|---|
| 9,543,779 B2 | 1/2017 | Won et al. | |
| 9,900,057 B2 | 2/2018 | Leabman et al. | |
| 10,396,859 B1 | 8/2019 | Hong et al. | |
| 2013/0107832 A1* | 5/2013 | Kim .................. | H04L 5/0035 370/329 |
| 2017/0005520 A1 | 1/2017 | Zeine et al. | |

(Continued)

FOREIGN PATENT DOCUMENTS

| KR | 10-2007-0085128 A | 8/2007 |
|---|---|---|
| KR | 10-2014-0129897 A | 11/2014 |

(Continued)

OTHER PUBLICATIONS

Sundaresan et al.; Optimal Beam Scheduling for Multicasting in Wireless Networks; Proc. the 15th MobiCom. ACM; 2009; pp. 205-216.

(Continued)

*Primary Examiner* — Zewdu A Kassa
(74) *Attorney, Agent, or Firm* — Jefferson IP Law, LLP

(57) ABSTRACT

A method for operating a power transmitting device in a wireless communication system is provided. The method includes receiving feedback information corresponding to power harvest from a plurality of electronic devices, performing beam scheduling based on the feedback information, and transmitting power to the plurality of the electronic devices using at least one beam based on the beam scheduling.

20 Claims, 10 Drawing Sheets

(56) References Cited

U.S. PATENT DOCUMENTS

| | | |
|---|---|---|
| 2017/0338685 A1 | 11/2017 | Jung et al. |
| 2018/0241255 A1* | 8/2018 | Leabman ................ H02J 50/23 |
| 2019/0044392 A1* | 2/2019 | Chowdhury ............ H02J 50/12 |
| 2019/0235041 A1 | 8/2019 | Lee |
| 2019/0372644 A1* | 12/2019 | Chen ...................... G06N 3/006 |

FOREIGN PATENT DOCUMENTS

| | | |
|---|---|---|
| KR | 10-2016-0051497 A | 5/2016 |
| KR | 10-2018-0002207 A | 1/2018 |
| KR | 10-2018-0056921 A | 5/2018 |
| KR | 10-2018-0056968 A | 5/2018 |
| KR | 10-1916636 B1 | 11/2018 |
| WO | 2017/004335 A1 | 1/2017 |
| WO | 2018/004116 A1 | 1/2018 |

OTHER PUBLICATIONS

Zhang et al.; Wireless Multicast Scheduling with Switched Beamforming Antennas; IEEE/ACM Transactions on Networking; vol. 20; No. 5; pp. 1595-1607; Oct. 2012.

Timotheou et al.; Beamforming for MISO Interference Channels with QoS and RF Energy Transfer; IEEE Transactions on Wireless Communication; vol. 13; No. 5; pp. 2646-2658; 2014.

Zeng et al.; Communications and Signals Design for Wireless Power Transmission; IEEE Transactions on Communications; vol. 65; No. 5; pp. 2264-2290; May 2017.

Korean Office Action with English translation dated May 11, 2020; Korean Appln. No. 10-2019-0045566.

\* cited by examiner

APPARATUS AND METHOD FOR TRANSMITTING AND RECEIVING INFORMATION AND POWER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0045566, filed on Apr. 18, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for performing beam scheduling based on feedback information in the wireless communication system.

2. Description of Related Art

A beamforming technique focuses energy of a signal in a particular direction using a plurality of antennas. The beamforming technique may be conducted based on channel state information (CSI) acquired mostly from a pilot signal. In the beamforming technique, feedback information for identifying the CSI of the multiple antennas may be subject to considerable overhead. In addition, high computational complexity may be required to estimate the CSI. However, this presents challenges in application. For example, wireless power transmission is utilized for low-power internet of things (IoT) devices having limited capabilities. Hence, to apply the wireless power transmission to low-power IoT devices, a beamforming technique is needed requiring low overhead and low computational complexity.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and a method for performing beam scheduling based on feedback information in a wireless communication system.

Another aspect of the disclosure is to provide an apparatus and a method for performing efficient beam scheduling based on feedback information indicative of whether an electronic device satisfies a required power harvest in a wireless communication system.

Additional aspects will be set forth in part in the description which follows and, in part, will be apparent from the description, or may be learned by practice of the presented embodiments.

In accordance with an aspect of the disclosure, a method for operating a power transmitting device in a wireless communication system is provided. The method includes receiving feedback information corresponding to power harvest from a plurality of electronic devices, performing beam scheduling based on the feedback information, and transmitting power to the plurality of the electronic devices using at least one beam based on the beam scheduling.

In accordance with another aspect of the disclosure, a power transmitting device in a wireless communication system is provided. The apparatus includes a communication transceiver and at least one processor coupled to the communication transceiver, wherein the at least one processor is configured to receive feedback information corresponding to power harvest from a plurality of electronic devices, perform beam scheduling based on the feedback information, and transmit power to the plurality of the electronic devices using at least one beam based on the beam scheduling.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms such as those defined in a generally used dictionary may be interpreted to have the meanings equal to the contextual meanings in the relevant field of art, and are not to be interpreted to have ideal or excessively formal meanings unless clearly defined in the disclosure. In some cases, even where a term is defined in the disclosure, it should not be interpreted to exclude various embodiments of the disclosure.

In various embodiment of the disclosure, a hardware approach will be described as an example. However, since various embodiments of the disclosure include a technology using both hardware and software, the disclosure does not exclude a software-based approach.

Hereinafter, the disclosure provides an apparatus and a method for performing beam scheduling based on feedback information in a wireless communication system. Specifically, the disclosure provides a technique for improving efficiency of wireless power transmission based on feedback information corresponding to small volume in the wireless communication system.

In the following, terms indicating signals, terms indicating feedback information, terms indicating control information, and terms indicating components of a device are mentioned for the sake of explanation. Accordingly, the disclosure is not limited to the terms to be described, and may use other terms having a technically equivalent meaning.

Figure 1A:
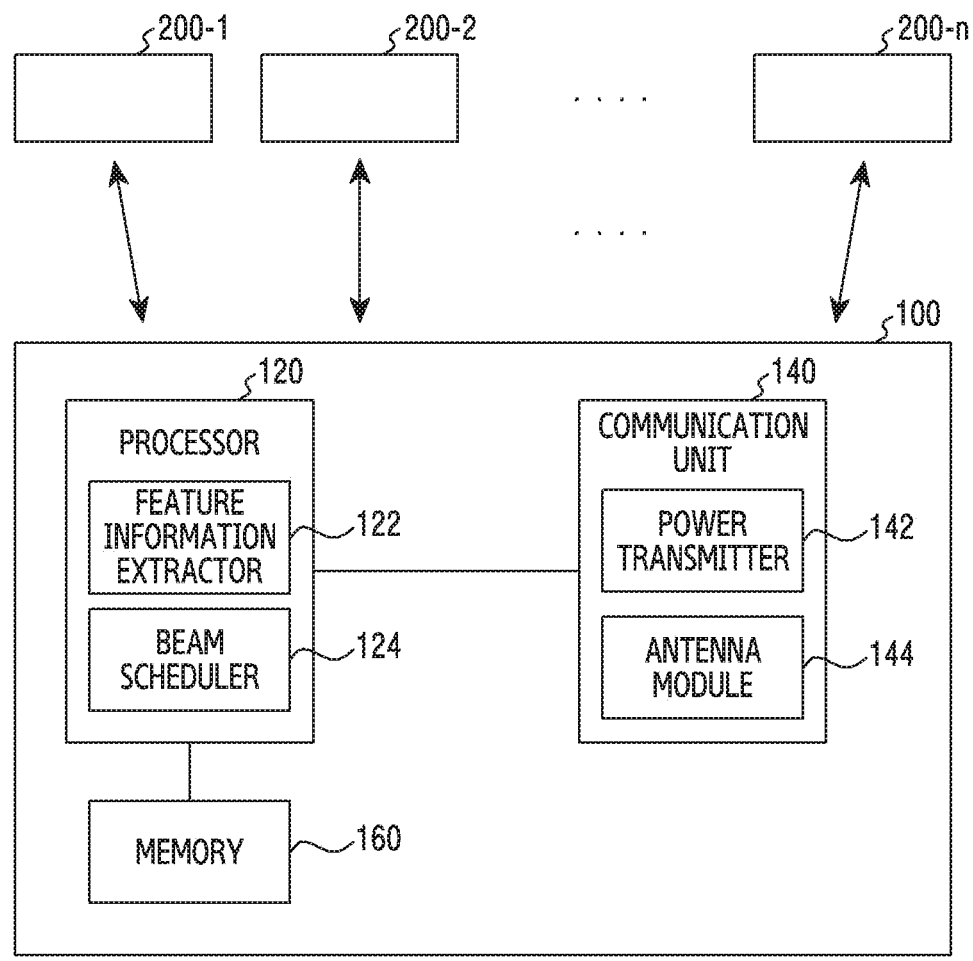
FIG. 1A is a block diagram that illustrates a power transmitting device for performing beam scheduling based on feedback information in a wireless communication system according to an embodiment of the disclosure.

FIG. 1A is a block diagram that illustrates a power transmitting device for performing beam scheduling based on feedback information in a wireless communication system according to an embodiment of the disclosure.

Figure 1B:
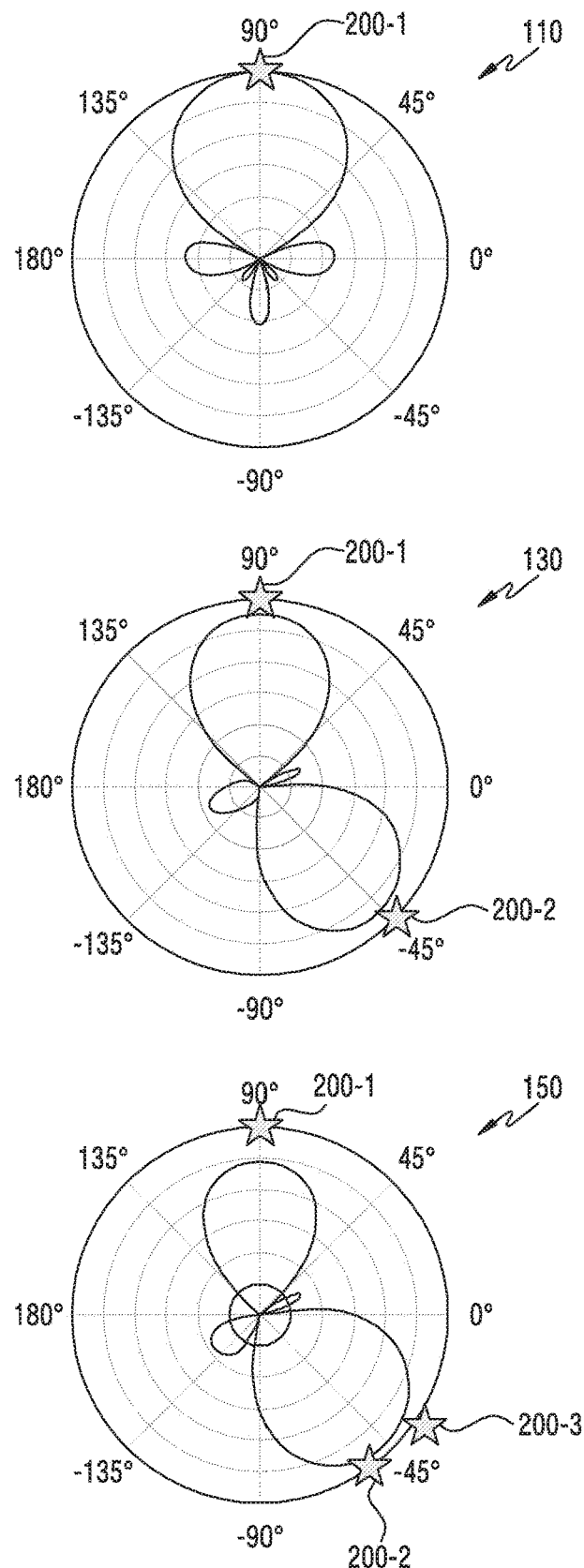
FIG. 1B illustrates examples of beam scheduling in consideration of a position of a power requesting device according to an embodiment of the disclosure.

FIG. 1B illustrates examples of beam scheduling in consideration of a position of a power requesting device according to an embodiment of the disclosure.

Referring to FIG. 1A, a power transmitting device 100 may include at least one processor 120, a communication unit, transceiver, or the like 140, and a memory 160.

The processor 120 may include a feature information extractor 122 and a beam scheduler 124. The processor 120 may control operations of the power transmitting device 100. For example, the processor 120 may control at least another component (e.g., a hardware or software component) connected to the processor 120, and process various data or calculations. According to an embodiment, as at least part of the data processing or calculation, the processor 120 may load a command or data received from other components to the memory 160, process a command or data stored in the memory 160, and store resultant data in the memory 160. According to an embodiment, the processor 120 may also control the device 100 to receive feedback information corresponding to energy harvest from a plurality of electronic devices, schedule a beam based on the feedback information, and transmit power to the plurality of the electronic devices based on the beam scheduling. For doing so, the processor 120 may include the feature information extractor 122 and the beam scheduler 124.

The feature information extractor 122 may extract feature information based on power request signals received from a plurality of power requesting devices 200-1 through 200-n. Herein, the feature information may include necessary information for the beam scheduling. For example, the feature information may include at least one of information about whether the power requesting devices 200-1 through 200-n each request power, a waveform of the received signal for each antenna or beam, average power of the received signal for each antenna or beam, and maximum power of the received signal for each antenna or beam.

The beam scheduler 124 may schedule beams used to transmit the wireless power to the power requesting devices 200-1 through 200-n. Herein, the beam scheduling may include at least one of selecting at least one beam for the wireless power transmission or allocating the transmit power to at least one beam. The beam scheduler 124 may schedule the beam using a beam scheduling engine. The beam scheduler 124 may schedule the beam by adjusting a weight on an antenna module 144. The beam scheduler 124 may update the beam scheduling based on the feedback information received from the power requesting devices 200-1 through 200-n and/or the feature information acquired by the feature information extractor 122. Such beam scheduling may achieve efficient power transmission to the power requesting device. Examples of the beam scheduling result are shown in FIG. 1B.

Referring to FIG. 1B, in beam scheduling 110 based on a position of one power requesting device, the beam scheduler 124 may schedule the beam for a power requesting device 200-1 positioned at 90° as shown in the first result 110. In beam scheduling 130 based on positions of two power requesting device 200-1 and 200-2, the beam scheduler 124 may schedule beams for the power requesting device 200-1 positioned at 90° and the power requesting device 200-2 positioned at −45° as shown in the second result 130. In beam scheduling 150 based on positions of three power requesting device 200-1, 200-2 and 200-3, the beam scheduler 124 may schedule beams for the power requesting device 200-1 positioned at 90° and the power requesting device 200-2 and the power requesting device 200-3 positioned near −45° as shown in the third result 150. According to various embodiments, the beam scheduler 124 may include an engine for scheduling an antenna or a beam.

Referring again to FIG. 1A, the communication unit 140 may support establishing a direct (e.g., wired) communication channel or a wireless communication channel between the power transmitting device 100 and an external electronic device (e.g., the power requesting device 200-1) or a server, and communications via the established communication channel. According to an embodiment, the communication unit 140 may include a wireless communication module (e.g., a cellular communication module, a short-range wireless communication module, or a global navigation satellite system (GNSS) communication module) or a wired communication module (e.g., a local area network (LAN) communication module, or a power line communication module). A corresponding one of these communication modules may communicate with the external electronic device over a first network (e.g., a short-range communication network such as Bluetooth, wireless-fidelity (Wi-Fi) direct or infrared data association (IrDA)) or a second network (e.g., a telecommunication network such as a cellular network, Internet, or a computer network (e.g., LAN or wide area network (WAN)). Such various communication modules may be integrated as one component (e.g., a single chip), or implemented as a plurality of separate components (e.g., multiple chips).

The communication unit 140 itself may include a power transmitter 142 and an antenna module 144. The power transmitter 142 may wirelessly transmit power to the power requesting devices 200-1 through 200-n through the antenna module 144 based on the beams scheduling result. For example, the power transmitter 142 may combine predefined single-lobe beam patterns based on the beam scheduling result, and wirelessly transmit the power to a plurality of the power requesting devices through the antenna module 144 using the combined beam pattern.

The antenna module 144 may transmit or receive the signal or the power to or from outside (e.g., the power requesting devices 200-1 through 200-n). According to an embodiment, the antenna module 144 may include one antenna including a conductor or a radiator of a conductive pattern formed on a substrate (e.g., a printed circuit board (PCB)). According to an embodiment, the antenna module 144 may include a plurality of antennas. In this case, at least one antenna adequate for the communication scheme used in the communication network may be selected from the plurality of the antennas by, for example, the power transmitter 142. The signal or the power may be transmitted or received to or from the external electronic device via the at least one selected antenna. According to an embodiment, components (e.g., radio frequency integrated circuit (RFIC)) other than the radiator may be further included as part of the antenna module 144.

The memory 160 may store various data used by at least one component (e.g., the processor 120) of the power transmitting device 100. The data may include, for example, feature information of the power requesting devices 200-1 through 200-n, feedback information corresponding to the power requesting devices 200-1 through 200-n, beam scheduling information of the power requesting devices 200-1 through 200-n, and input data or output data of their relevant command.

Figure 2:
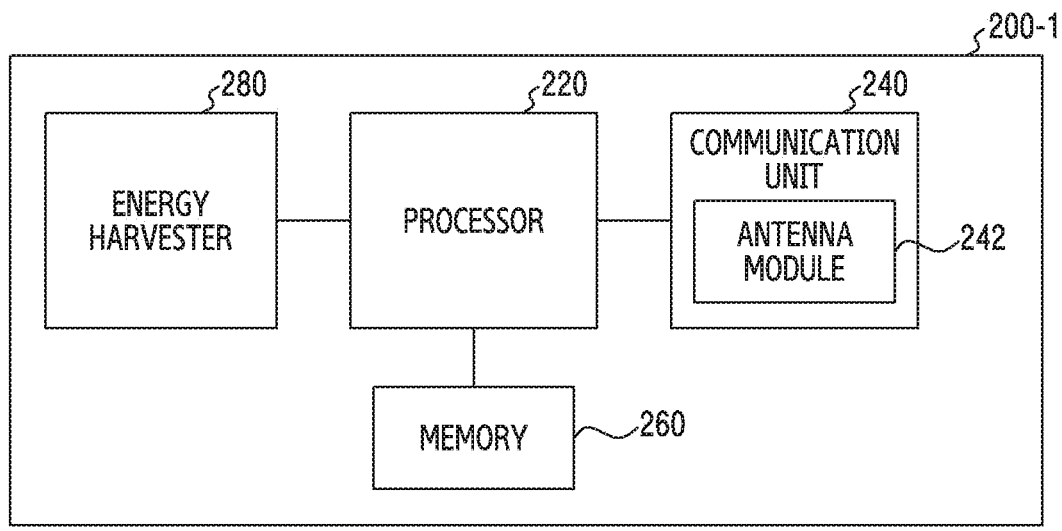
FIG. 2 is a block diagram that illustrates a power requesting device for performing beam scheduling based on feedback information in a wireless communication system according to an embodiment of the disclosure.

FIG. 2 is a block diagram that illustrates a power requesting device for performing beam scheduling based on feedback information in a wireless communication system according to an embodiment of the disclosure. While FIG. 2 illustrates the power requesting device 200-1, the other power requesting devices 200-2 through 200-n may have a similar configuration.

Referring to FIG. 2, the power requesting device 200-1 may include at least one processor 220, a communication unit, transceiver, or the like 240, a memory 260, and an energy harvester 280.

The processor 220 may control operations of the power requesting device 200-1. For example, the processor 220 may control at least another component (e.g., a hardware or software component) connected to the processor 220, and process various data or calculations. According to an embodiment, as at least part of the data processing or calculation, the processor 220 may load a command or data received from other components to the memory 260, process a command or data stored in the memory 260, and store resultant data in the memory 260. The processor 220 may control the device to harvest wireless power received from the power transmitting device 100, and generate feedback information based on the harvested wireless power. For example, the processor 220 may control the device to harvest the wireless power received from the power transmitting device 100, and determine whether the harvested wireless power satisfies a required power harvest. According to an embodiment, the processor 220 may also control the device to transmit feedback information corresponding to the power harvest to the power transmitting device 100, and receive wireless power from the power transmitting device 100 based on updated beam scheduling.

The communication unit 240 may include an antenna module 242. The communication unit 240 may support establishing a direct (e.g., wired) communication channel or a wireless communication channel between the power requesting device 200-1 and an external electronic device (e.g., the power transmitting device 100) or a server, and support communications over the established communication channel. The communication unit 240 may include one or more communication processors which are operated independently from the processor 220 (e.g., an application processor) and support a direct (e.g., wired) communication or a wireless communication. According to an embodiment, the communication module 240 may include a wireless communication module (e.g., a cellular communication module, a short-range wireless communication module, or a GNSS communication module) or a wired communication module (e.g., a LAN communication module or a power line communication module). A corresponding one of these communication modules may communicate with the external electronic device via the first network (e.g., a short-range communication network, such as Bluetooth, WiFi direct, or IrDA) or the second network (e.g., a telecommunication network such as a cellular network, the Internet, or a computer network (e.g., LAN or WAN). These various types of communication modules may be implemented as a single component (e.g., a single chip), or may be implemented as multiple components (e.g., multiple chips) which are separated from each other.

The antenna module 242 may transmit or receive the signal or the power to or from outside (e.g., the power transmitting device 100). According to an embodiment, the antenna module 242 may include one antenna including a conductor or a radiator of a conductive pattern formed on a substrate (e.g., a PCB). According to an embodiment, the antenna module 144 may include a plurality of antennas. In this case, at least one antenna adequate for the communication scheme used in the communication network may be selected from the plurality of the antennas by, for example, the processor 220. The signal or the power may be transmitted or received to or from the external electronic device via the at least one selected antenna. According to an embodiment, components (e.g., RFIC) other than the radiator may be further included as part of the antenna module 242.

The memory 260 may store various data used by at least one component (e.g., the processor 220) of the power requesting device 200-1. The data may include, for example, a power harvest of the power requesting device 200-1, a required power harvest of the power requesting device 200-1, the feedback information corresponding to the power requesting device 200-1, and input data or output data of their relevant command.

The energy harvester 280 may harvest energy based on the signal received from the power transmitting device 100. In other words, the energy harvester 280 may harvest the energy from both ends of a direct current (DC) signal obtained by forward rectification and a DC signal obtained by reverse rectification based on the signal received from the power transmitting device 100. For example, if a potential difference of the two DC signals is A, the energy is harvested from the DC signal having the amplitude A.

According to an embodiment, the energy harvester 280 may reside in the power requesting device 200-1 as a component separate from the communication unit 240, as shown in FIG. 2. However, according to another embodiment, the energy harvester 280 may be included in the communication unit 240. That is, the communication unit 240 may receive the signal from the power transmitting device 100, and harvest the energy based on the received signal. In other words, the communication unit 240 may harvest the energy from both ends of the DC signal obtained by the forward rectification and the DC signal obtained by the reverse rectification through the energy harvester 240 based on the signal received from the power transmitting device 100.

Figure 3:
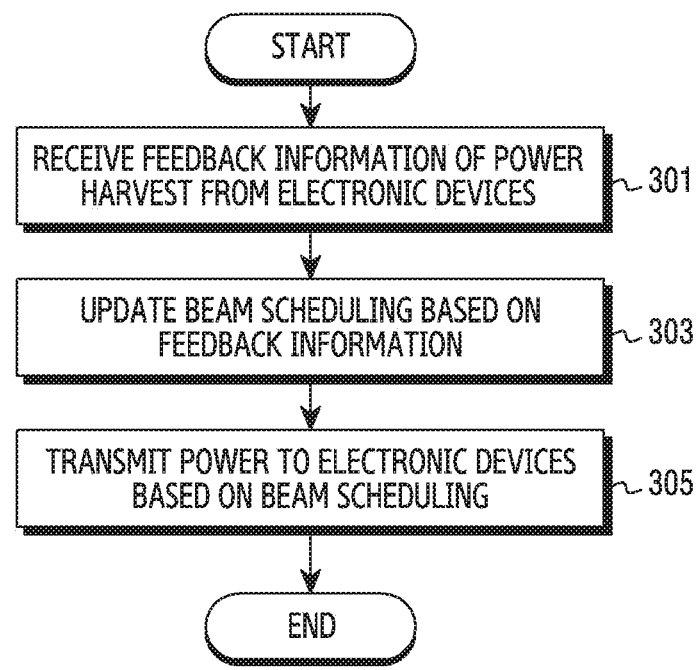
FIG. 3 is a flowchart that illustrates a method for performing beam scheduling based on feedback information in a wireless communication system according to an embodiment of the disclosure.

FIG. 3 is a flowchart that illustrates a method for performing beam scheduling based on feedback information in a wireless communication system according to an embodiment of the disclosure. FIG. 3 illustrates an operating method of a power transmitting device.

Referring to FIG. 3, in operation 301, the power transmitting device 100 may receive feedback information corresponding to power harvest from the power requesting devices 200-1 through 200-*n*. Herein, the feedback information corresponding to the power harvest may include information indicating whether the power requesting devices each satisfy the required power harvest.

In operation 303, the power transmitting device 100 may perform beam scheduling based on the received feedback information. That is, the power transmitting device 100 may perform the beam scheduling based on whether the power requesting devices 200-1 through 200-*n* each satisfy the required power harvest. For example, the power transmitting device 100 may perform the beam scheduling through a beam scheduling engine used by the power transmitting device 100, based on the feedback information received from the power requesting devices 200-1 through 200-*n*. According to an embodiment, the power transmitting device 100 may update the beam scheduling based on the feedback information received from the power requesting devices 200-1 through 200-*n*.

In operation 305, the power transmitting device 100 may wirelessly transmit power to the power requesting devices 200-1 through 200-*n* based on the beam scheduling. For example, the power transmitting device 100 may combine predefined single-lobe beam patterns based on the beam scheduling result, and wirelessly transmit the power to the power requesting devices 200-1 through 200-*n* through the antenna module 144 using the combined beam pattern.

Referring to FIG. 3, the power transmitting device 100 may further include receiving power request signals from the power requesting devices 200-1 through 200-*n*, and determining feature information based on the power request signals received from the power requesting devices 200-1 through 200-*n*. Herein, the feature information may include necessary information for the beam scheduling. For example, the feature information may include information about whether the power requesting devices 200-1 through 200-*n* each request the power, a waveform of the received signal for each antenna or beam, average power of the received signal for each antenna or beam, and maximum power of the received signal for each antenna or beam.

The following describes specific operations for scheduling the beam based on the feedback information in the wireless communication system according to various embodiments of the disclosure.

Figure 4:
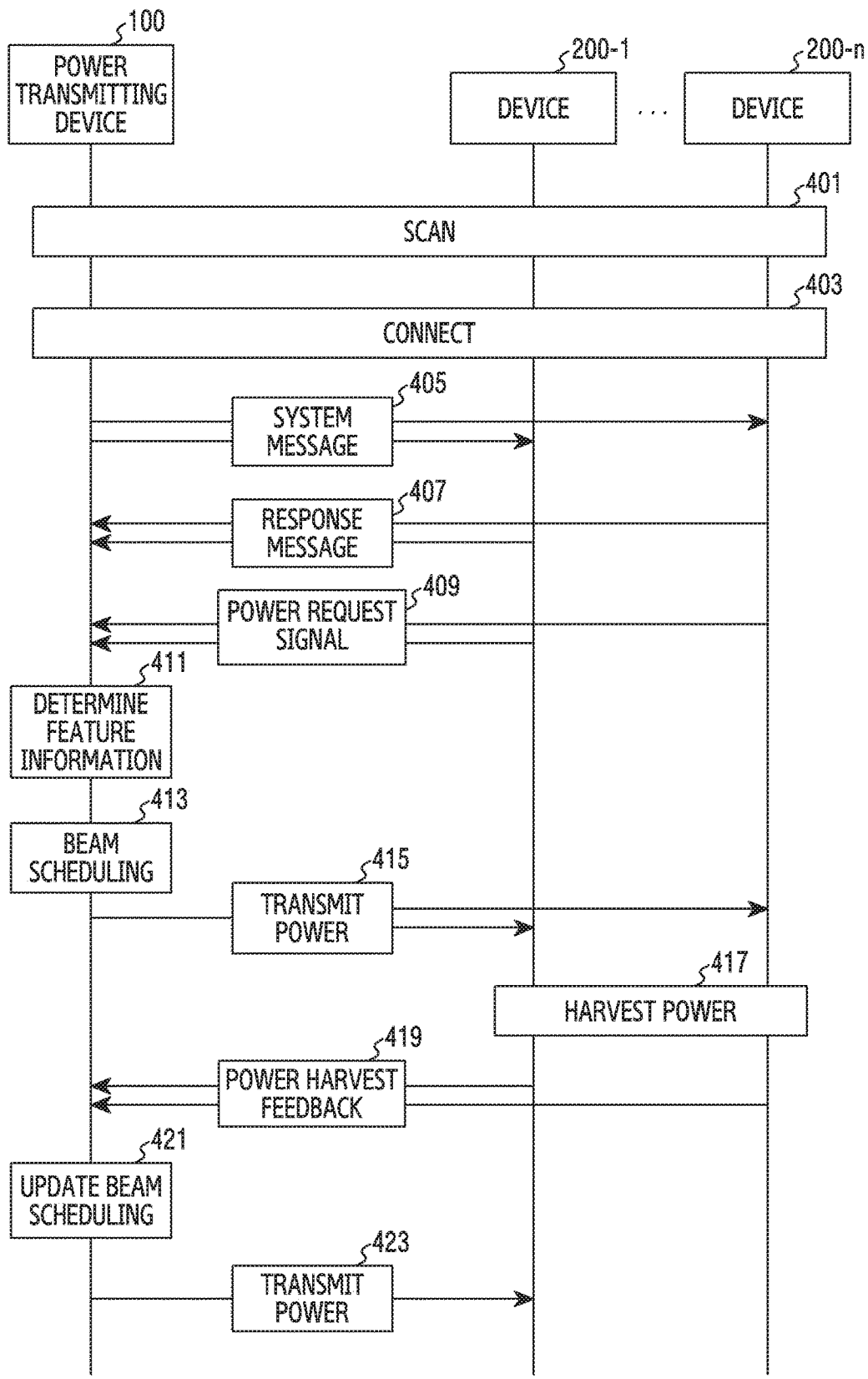
FIG. 4 illustrates a signal flow diagram for performing beam scheduling based on feedback information in a wireless communication system according to an embodiment of the disclosure.

FIG. 4 illustrates a signal flow diagram for performing beam scheduling based on feedback information in a wireless communication system according to an embodiment of the disclosure.

Referring to FIG. 4, the flow diagram illustrates an example of a signal exchange between the power transmitting device 100 and the power requesting devices 200-1 through 200-*n*, in the beam scheduling based on the feedback information in the wireless communication system. Preparation for beam scheduling may include operation 401, operation 403, operation 405, and operation 407.

In operation 401, the power transmitting device 100 and the power requesting devices 200-1 through 200-*n* scan for mutual presence. For example, the power requesting devices 200-1 through 200-*n* may scan a beacon signal of the power transmitting device 100, or the power requesting devices 200-1 through 200-*n* may transmit a beacon signal and the power transmitting device 100 may scan the beacon signal.

In operation 403, the power transmitting device 100 and the power requesting devices 200-1 through 200-*n* may be connected wirelessly. The power transmitting device 100 and the power requesting devices 200-1 through 200-*n* may prepare to transmit or receive system information. In so doing, the power transmitting device 100 and the power requesting devices 200-1 through 200-*n* may share connection information. Herein, the connection information may include identification information of the power transmitting device 100, identification information of the power requesting devices 200-1 through 200-*n*, security information, required power harvests of the power requesting devices 200-1 through 200-*n*, and device specification information (e.g., efficiency of a power harvesting circuit, communication capability of the device).

In operation 405, the power transmitting device 100 may transmit system information required by the power requesting device, to the power requesting devices 200-1 through 200-*n*. The system information may include system operation information, and may include, for example, system operation mode (e.g., a first mode, a second mode) information, radio resource frame information, power request signal resource information, power request transmission scheme information (e.g., a transmit signal, a transmit power), feedback resource information, and feedback information (e.g., meaning of feedback information, the number of transmit bits). For example, the first mode of the system operation mode information may schedule the beam for the power requesting device having no mobility. For further example, the second mode of the system operation mode information may schedule the beam for the power requesting device having mobility.

In operation 407, the power requesting devices 200-1 through 200-n may transmit a response message to the power transmitting device 100, in response to receiving the system message. Herein, the response message may be an acknowledge (ACK) message indicating the system message received or a negative acknowledge (NACK) message indicating the system message not received.

Through the preparation for the beam scheduling as stated above, the power transmitting device 100 may identify the presence of the power requesting devices 200-1 through 200-n, and conduct learning for the efficient beam scheduling.

In operation 409, the power requesting devices 200-1 through 200-n may request a power request signal to the power transmitting device 100. According to an embodiment, if the system operation mode is the first mode, the power requesting devices 200-1 through 200-n without mobility may transmit a 1-bit power request signal using orthogonal resource per device. In so doing, the power request signal may be transmitted using a multiple access function such as time division multiple access (TDMA), orthogonal frequency division multiple access (OFDMA), and frequency division multiple access (FDMA). According to an embodiment, if the system operation mode is the second mode, the power requesting devices 200-1 through 200-n with mobility may transmit the power request signal using the same resource. In so doing, the power transmitting device 100 may receive the power request signal for every antenna or beam.

In operation 411, the power transmitting device 100 may determine feature information based on the received power request signal. Herein, the feature information may be necessary information for the beam scheduling. According to an embodiment, if the system operation mode is the first mode, the power transmitting device 100 may determine information of whether the power requesting devices 200-1 through 200-n request the power, as the feature information. For example, the power transmitting device 100 may receive the power request $x=(x_1, x_2, \ldots, x_N)^T$ of the power requesting devices 200-1 through 200-n, and the power request x of the power requesting device N may be $x \in \{0,1\}$. Herein, 0 is a value indicating no power request, and 1 is a value indicating the power request. According to an embodiment, if the system operation mode is the second mode, the power transmitting device 100 may determine the feature information from the received signal of each antenna or beam. For example, the power transmitting device 100 may receive a received signal of a length T for each antenna or beam, and the feature information may include received signal strength per antenna/beam, a waveform of the received signal, average power, and maximum power. According to various embodiments, the power transmitting device 100 may omit operation 411 of determining the feature information, and may schedule the beam based on the received signal.

In operation 413, the power transmitting device 100 may perform the beam scheduling based on the feature information. Herein, the beam scheduling may include allocating the transmit power to at least one antenna or at least one beam. Based on the determined feature information, the power transmitting device 100 may schedule the beam using a scheduling engine for the antenna or the beam. For example, the scheduling engine may be implemented using a contextual multi-armed bandit scheme, a reinforcement learning (e.g., Q-learning, state-action-reward-state-state (Sarsa), actor-critic) scheme, or a deep reinforcement (e.g., deep Q-learning) scheme. According to an embodiment, if the system operation mode is the first mode, the contextual multi-armed bandit scheme may be used as the scheduling engine. According to an embodiment, if the system operation mode is the second mode, the deep reinforcement learning scheme may be used as the scheduling engine. The beam scheduling may be performed on an antenna or a beam which covers a three-dimensional space.

In operation 415, the power transmitting device 100 may transmit the power to the power requesting devices 200-1 through 200-n based on the beam scheduling. That is, the power transmitting device 100 may set a beam or an antenna using the beam scheduling result, and transmit the power to the power requesting devices 200-1 through 200-n. For example, the power transmitting device 100 may combine predefined single-lobe beam patterns based on the beam scheduling result, and wirelessly transmit the power to the power requesting devices 200-1 through 200-n through the antenna module 144 using the combined beam pattern.

In operation 417, the power requesting devices 200-1 through 200-n receiving the power signal may harvest the power. That is, the power requesting devices 200-1 through 200-n each may harvest the power by receiving a power signal from the power transmitting device 100.

In operation 419, the power requesting devices 200-1 through 200-n each may transmit its feedback information to the power transmitting device 100. For example, the power requesting devices 200-1 through 200-n may determine whether they satisfy the required power harvest, and transmit the feedback information corresponding to whether the required power harvest is satisfied, to the power transmitting device 100. The required power harvest may be a predefined threshold for the harvested power of the power requesting device. According to an embodiment, the power requesting devices 200-1 through 200-n may transmit 1-bit feedback information to the power transmitting device 100 using orthogonal resource per device. Herein, the 1-bit feedback information may be transmitted with 1 if the required power harvest is satisfied, and with 0 if the required power harvest is not satisfied. For example, the power requesting devices 200-1 through 200-n may transmit the 1-bit feedback information corresponding to 1 if the power harvest exceeds the predefined threshold, and transmit the 1-bit feedback information corresponding to 0 if the power harvest falls below the predefined threshold. In addition, if using on-off keying (OOK), only the power requesting device, which satisfies the required power harvest, of the power requesting devices 200-1 through 200-n may transmit the feedback information. According to an embodiment, the power requesting devices 200-1 through 200-n may quantize their power harvest to N bits, and transmit N-bit feedback information to the power transmitting device 100. For example, the feedback information quantized to the N bits may include a linear quantization signal of a range from a minimum power harvest to a maximum power harvest, a linear quantization signal of the range from the minimum power harvest to the maximum power harvest on a decibel (dB)-scale, or a quantization signal of a range from the minimum power harvest to the required power harvest.

In operation 421, the power transmitting device 100 may update the beam scheduling based on the feedback information. For example, the power transmitting device 100 may update the beam scheduling based on the determined feature information and/or the feedback information through the scheduling engine.

In operation 423, the power transmitting device 100 may transmit the power to the power requesting devices 200-1 through 200-*n* based on the updated beam scheduling. For example, the power transmitting device 100 may wirelessly transmit the power to at least one power requesting device, which does not satisfy the required power harvest, of the power requesting devices 200-1 through 200-*n* based on the updated beam scheduling.

According to an embodiment, the power transmitting device 100 and the power requesting devices 200-1 through 200-*n* may repeat operation 409 through operation 421, and thus the power transmitting device 100 may perform the beam scheduling to maximize average power request satisfaction of the power requesting devices 200-1 through 200-*n*. For example, by repeating operation 409 through operation 412, the beam scheduling engine of the power transmitting device 100 may learn optimal beam scheduling, and the power transmitting device 100 may perform the beam scheduling to maximize the average power request satisfaction of the power requesting devices 200-1 through 200-*n* through the learned beam scheduling engine, based on such learning.

The method for performing the beam scheduling as stated above illustrates a method for changing to the first mode or the second mode based on the system operation mode information of the system information in the power transmitting device 100. That is, according to the embodiment of FIG. 4, the power transmitting device 100 may support both of the first mode and the second mode, and may selectively operate in either the first mode or the second mode according to a situation.

However, according to another embodiment, the system operation mode may be fixed to either the first mode or the second mode. That is, the power transmitting device 100 may support either the first mode or the second mode. In this case, the power requesting devices 200-1 through 200-*n* may transmit the power request signal to the power transmitting device 100 according to the preset system operation mode. The power transmitting device 100 may determine feature information based on the received power request signal, and schedule the beam based on the determined feature information. If the system operation mode is preset, the system information may not include the system operation mode information in operation 405.

According to various embodiments, a beam scheduling algorithm using the 1-bit feedback information to maximize the satisfaction of the required power harvest of the power requesting device based on whether the power requesting device satisfies the required power harvest is as shown in Table 1.

TABLE 1

Algorithm 1 BW-CLOB

1: Input: Total time-slots T, system parameters $\tau$ and $\alpha$.
2: for t = 1, 2, ..., $\tau$ do
3:    Observe $x_t$ from the devices
4:    Randomly choose $a_t \in \mathcal{A}$
5:    Observe and store $y_{n,t}$ from the devices
6:    $V_{n,t+1} \leftarrow V_{n,t} + x_{n,t} \cdot a_t a_t^T, \forall_n \in [N]$
7: end for
8: for t = $\tau$ + 1, $\tau$ + 2, ..., T do
9:    Calculate $\hat{p}_{n,t}$ for all n $\in$ [N] by solving $\Sigma_{i=1}^{j-1} x_{n,j}(y_{n,i} - \mu_n(a_i^T p_{n,i})a_i = 0$
10:    Observe $x_t$ from the devices TABLE 1-continued Algorithm 1 BW-CLOB 11:    Choose $a_t \leftarrow \text{argmax}_{\mathbf{a} \in \mathcal{A}} \Sigma_{n \in [N]} x_{n,t} \mu_n(a^T \hat{p}_{n,t} + \alpha \|a\|_{V_{n,t}^{-1}})$
12:    Observe and store $y_{n,t}$ from the devices
13:    $V_{n,t+1} \leftarrow V_{n,t} + x_{n,t} \cdot a_t a_t^T, \forall n \in [N]$
14: end for In the above algorithm, $x_t = (x_{1,t}, x_{2,t}, \ldots, x_{N,t})^T$ denotes whether the power requesting devices 200-1 through 200-*n* request the power at a time slot t. The power request x of the power requesting device n may be $x \in \{0,1\}$. In the above algorithm, 0 indicates no power request, and 1 indicates the power request. In the above algorithm, at is a vector indicating a beam pattern transmitted at the time slot t. In the above algorithm, $y_{n,t} \in \{0,1\}$ denotes whether the device n satisfies the power harvest at the time slot t. In the above algorithm, $p_n = (p_{1,n}, p_{2,n}, \ldots, p_{K,n})^T$ denotes the power harvest of the power requesting device n if each beam or antenna is used. In the above algorithm, $\hat{p}_{n,t}$ denotes a value estimated through learning of $p_n$ at the time slot t. In the above algorithm, $V_{n,t}$ denotes a variable for considering a confidence interval of the $\hat{p}_{n,t}$ learning.

Based on the above-stated algorithm, the power transmitting device 100 may learn the power harvest of each power requesting device if each beam or antenna is used in every time slot based on past feedback information, calculate an optimal transmit beam pattern in the confidence interval based on the learned harvest information and an error rate, transmit the power in the calculated beam pattern, and receive and store feedback.

According to various embodiments, a beam scheduling algorithm using the N-bit feedback information to maximize the required power harvest or the power harvest based on the N-bit power harvest is shown in Table 2.

TABLE 2

Algorithm 2 BW-CLOB

1: Input: Total time-slots T, system parameters $\tau$ and $\alpha$.
2: for t = 1, 2, ..., $\tau$ do
3:    Observe $x_t$ from the devices
4:    Randomly choose $a_t \in \mathcal{A}$
5:    Observe and store $h_{n,t}$ from the devices
6:    $V_{n,t+1} \leftarrow V_{n,t} + x_{n,t} \cdot a_t a_t^T, \forall n \in [N]$
7:    $b_{n,t+1} \leftarrow b_{n,t} + x_{n,j} a_t h_{n,t}, \forall n \in [N]$
8: end for
9: for t = $\tau$ + 1, $\tau$ + 2, ..., T do
10:    Calculate $\hat{p}_{n,t}$ for all n $\in$ [N] as $\hat{p}_{n,t} = A_{n,t}^{-1} b_{n,t}$
11:    Observe $x_t$ from the devices
12:    Choose $a_t \leftarrow \text{argmax}_{\mathbf{a} \in \mathcal{A}} \Sigma_{n \in [N]} x_{n,t} \mu_n(a^T \hat{p}_{n,t} + \alpha \|a\|_{V_{n,t}^{-1}})$
13:    Observe and store $h_{n,t}$ from the devices
14:    $V_{n,t+1} \leftarrow V_{n,t} + x_{n,t} \cdot a_t a_t^T, \forall n \in [N]$
15:    $b_{n,t+1} \leftarrow b_{n,t} + x_{n,t} a_t h_{n,t}, \forall n \in [N]$
16: end for In the above-stated algorithm, $x_t$ denotes whether the power requesting devices 200-1 through 200-*n* request the power in the time slot t. The power request x of the power requesting device n may be $x \in \{0,1\}$. In the above-stated algorithm, 0 is the value indicating no power request, and 1 is the value indicating the power request. In the above-stated algorithm, $a_t$ is a vector indicating the beam pattern transmitted at the time slot t. In the above-stated algorithm, $y_{n,t} \in \{0,1\}$ denotes whether the device n satisfies the power harvest in the time slot t. In the above-stated algorithm, $p_n = (p_{1,n}, p_{2,n}, \ldots p_{K,n})^T$ denotes the power harvest of the power requesting device n if each beam or antenna is used. In the above-stated algorithm, $\hat{p}_{n,t}$ denotes a value estimated by learning $p_n$ in the time slot t. In the above-stated algorithm, $V_{n,t}$ denotes the variable for considering the confidence interval of the $p^{\rightarrow}_{n,t}$ learning. In the above-stated algorithm, $b_{n,t}$ denotes a variable for the $p^{\wedge}_{n,t}$ learning. In the above-stated algorithm, $h_{n,t}$ denotes the power harvest of the power requesting device n expressed with N bits in the time slot t.

Based on the above-stated algorithm, the power transmitting device 100 may learn the power harvest of each power requesting device if each beam or antenna is used in every time slot based on past feedback information, calculate an optimal transmit beam pattern in the confidence interval based on the learned harvest information and the error rate, transmit the power in the calculated beam pattern, and receive and store feedback.

According to various embodiments, in the beam scheduling using the 1-bit or N-bit feedback information, an optimal beam scheduling algorithm for calculating the transmit beam pattern based on the learned harvest and the confidence interval is shown in Table 3.

TABLE 3

Algorithm 2: Branch-Reduce-and-Bound Algorithm

1: $M_0 \leftarrow [0, p^{max}e]$ and $\mathcal{P} \leftarrow \{M_0\}$
2: LBD $\leftarrow -\infty$ and UBD $\leftarrow \Sigma_{n\in[N]}x_n$
3: while UBD − LBD > $\rho$ do
4:     $M^{max} \leftarrow \text{argmax}_{M\in\mathcal{P}} \beta(M)$
5:     Branching: Partition $M^{max}$ into two boxes $\hat{M}_1$ and $\hat{M}_2$ as in (11) and (12)
6:     Reduction: Reduce $\hat{M}_1$ and $\hat{M}_2$ as in (13)
7:     If $\Sigma_{k\in[K]}\hat{x}_{2,k} \le p^{max}$ then
8:        Bounding: Calculate $\overline{LBD}$ and $\overline{UBD}$ from $\hat{M}_2$ as in (15)
9:        LBD $\leftarrow$ max (LBD, $\overline{LBD}$)
10:       $\beta(\hat{M}_2) \leftarrow \min(\beta(\hat{M}_2), \overline{UBD})$
11:     else
12:        $\hat{M}_2 = 0$
13:     end if
14:     $\mathcal{P} \leftarrow \mathcal{P} \backslash \{M_{max}\} \cup \{\hat{M}_1, \hat{M}_2\}$
15:     UBD $= \max_{M\in\mathcal{P}} \beta(M)$
16: end while The above-stated optimal scheduling algorithm is subject to high complexity, but may calculate an optimal solution $a_r$ of a corresponding problem. For example, the optimal scheduling algorithm may use z branch-reduce-and-bound algorithm which is known in a monotonic optimization scheme.

According to various embodiments, a heuristic scheduling algorithm for calculating the transmit beam pattern based on the learned harvest and the confidence interval using the 1-bit or N-bit feedback information is shown in Table 4.

TABLE 4

Alogorithm 3 UCB-Based Heuristic Algorithm

1: $\mathcal{N}_{req} = \{n | x_n = 1\}$, $a = 0$, and $a_{res} = p^{max}$

2: $p_{req}(n) = \dfrac{\psi_n}{\eta_n}$, $\forall n \in \mathcal{N}_{req}$, $p_{req}(n) = \infty$, $\forall n \in [N]\backslash\mathcal{N}_{req}$ 3: UCB(n, k) $= e_k^T \hat{p}_n + \alpha \|e_k\|_{V_n^{-1}}$
4: while $\mathcal{N}_{req} \ne \emptyset$ and $\mathcal{Z}_{av} \ne \emptyset$ do 5:     $a_{req}(n, k) \leftarrow \dfrac{p_{req}(n)}{UCB(n, k)}$, $\forall n \in \mathcal{N}_{req}$, $\forall k \in [K]$ 6:     Sort $\{a_{req}(n, k)\}_{n\in\mathcal{N}_{req}}$ in an ascending order and denote $\{a_{req}^{(m)}(k)\}_{m\in[|\mathcal{N}_{req}|]}$ for all $k \in [K]$ as in (16).

TABLE 4-continued

Alogorithm 3 UCB-Based Heuristic Algorithm

7:     $\mathcal{Z}_{av} \leftarrow \{(m, k) | a_{req}^{(m)}(k) \le a_{res}\}$

8:     $b_{req}(m, k) \leftarrow \dfrac{a_{req}^{(m)}(k)}{m}$, $\forall (m, k) \in \mathcal{Z}_{av}$ 9:     $(m^*, k^*) \leftarrow \text{argmin}_{(m,k)\in\mathcal{Z}_{av}} b_{req}(m, k)$ 10:   $a_{k^*} \leftarrow a_{k^*} + a_{req}^{(m^*)}(k^*)$
11:   $p_{req}(n) \leftarrow p_{req}(n) - UCB(n, k^*)a_{req}^{(m^*)}(k^*)$, $\forall n \in \mathcal{N}_{req}$
12:   $a_{res} \leftarrow a_{res} - a_{req}^{(m^*)}(k^*)$
13:   $\mathcal{N}_{req} \leftarrow \mathcal{N}_{req} \backslash \{n | a_{req}(n, k^*) \le a_{req}^{(m^*)}(k^*)\}$
14: end while
15: if $a_{res} \ne 0$ then 16:     $a \leftarrow a + a_{res} \dfrac{a}{\|a\|_1}$ 17: end if The above heuristic scheduling algorithm may calculate a sub-optimal solution with low complexity, and perform greedy scheduling to maximize the power requesting device which satisfies the required power harvest based on the learned information.

Figure 5A:
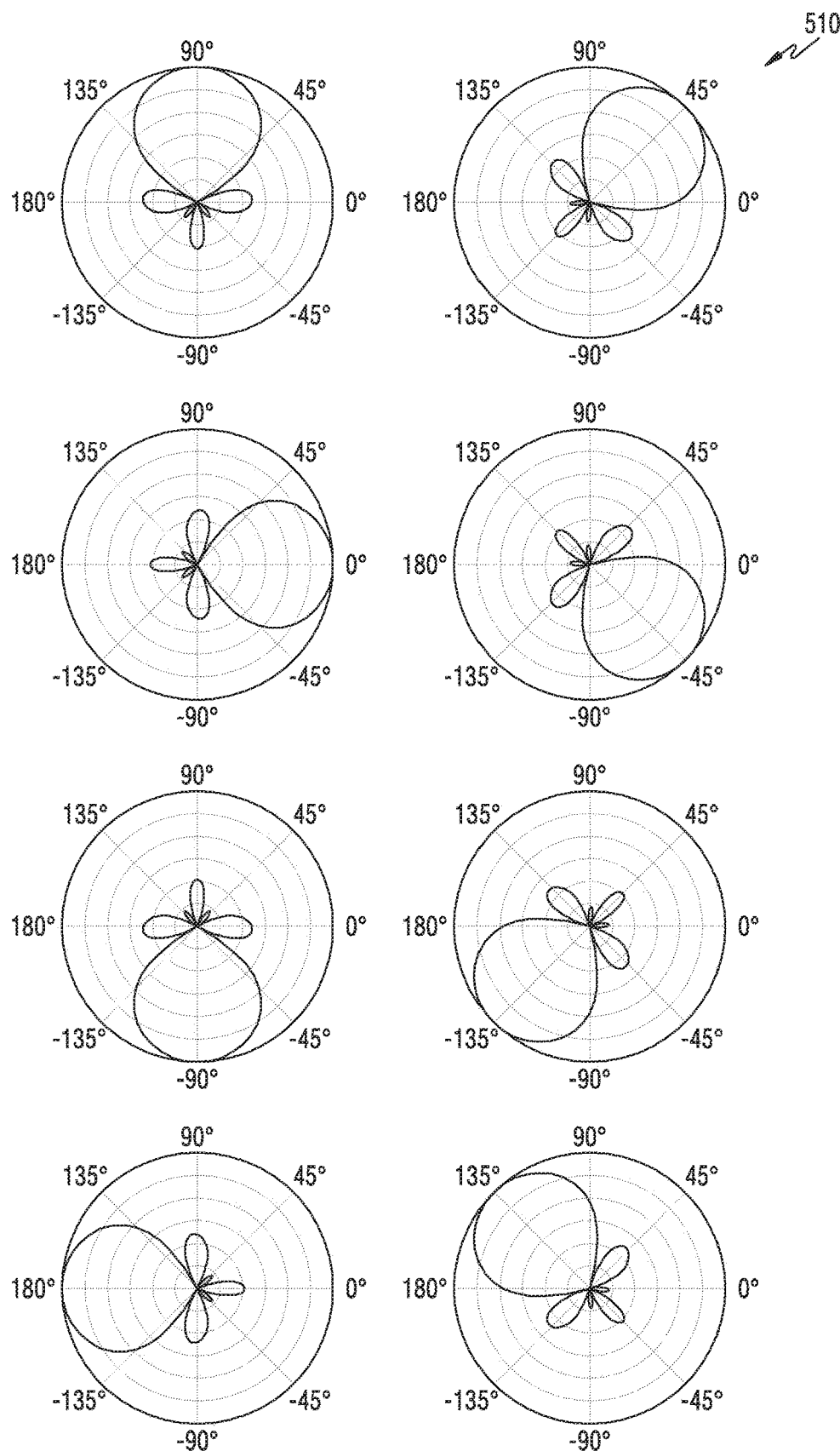
FIG. 5A illustrates beam patterns generated using beam scheduling based on feedback information in a wireless communication system according to an embodiment of the disclosure.
Figure 5B:
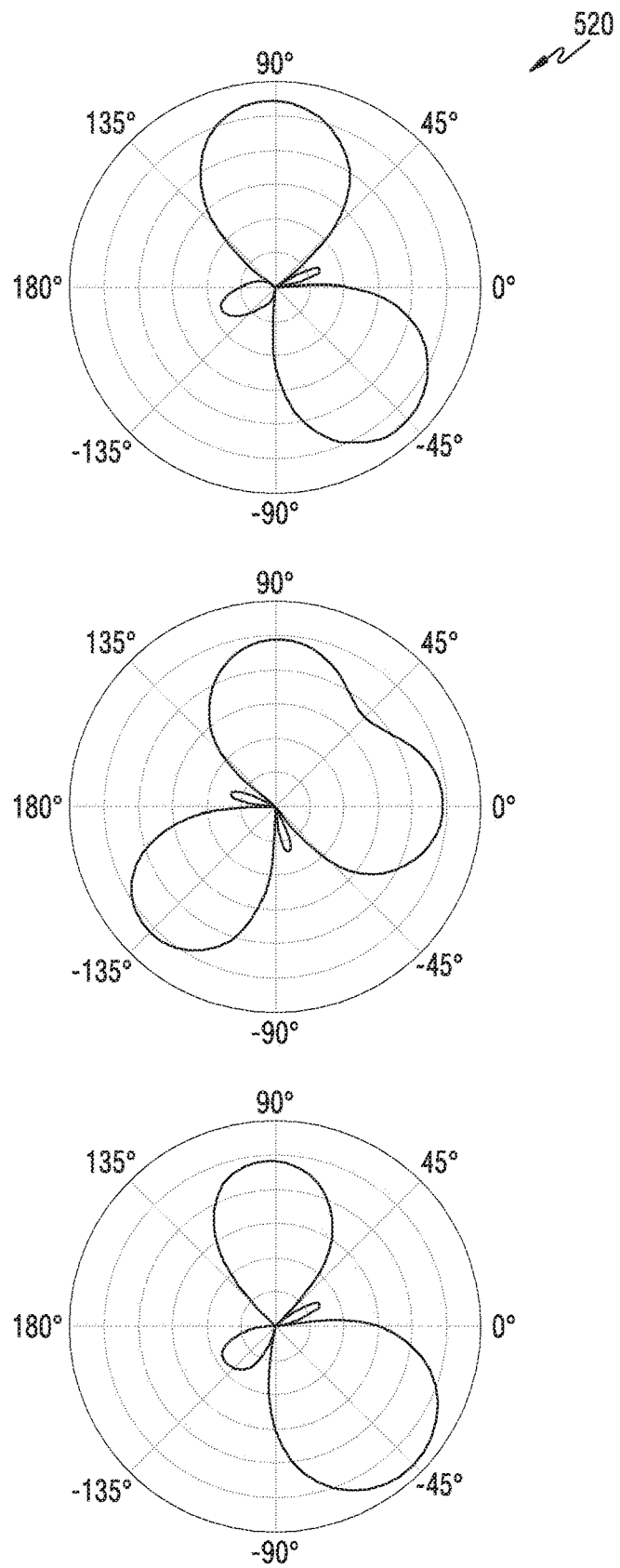
FIG. 5B further illustrates beam patterns generated using beam scheduling based on feedback information in a wireless communication system according to an embodiment of the disclosure.
Figure 5C:
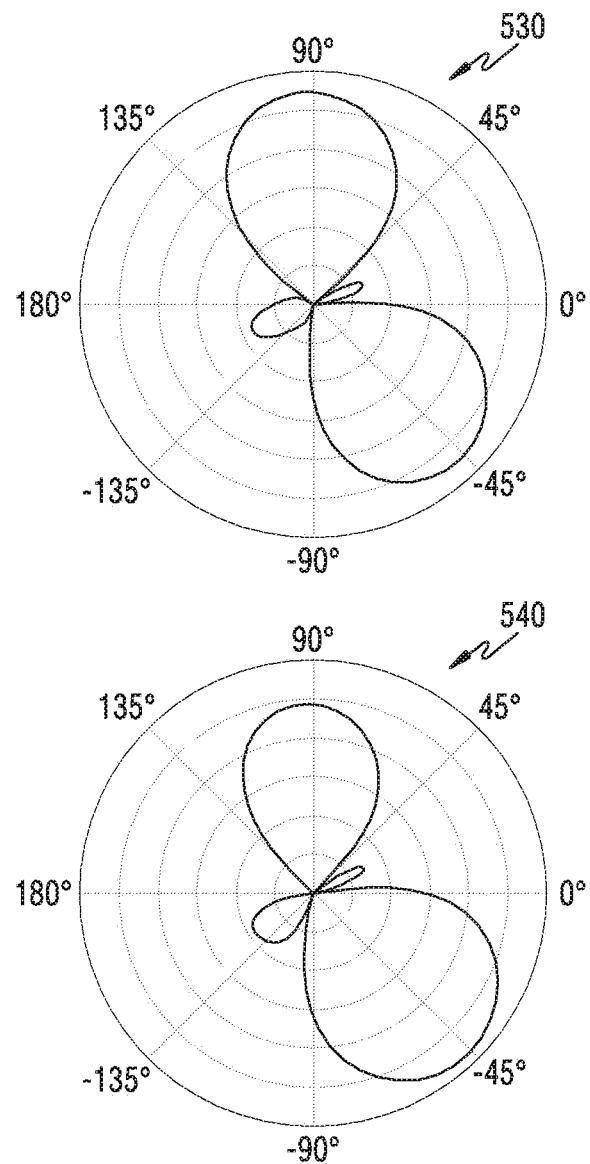
FIG. 5C further illustrates beam patterns generated using beam scheduling based on feedback information in a wireless communication system according to an embodiment of the disclosure.

FIGS. 5A, 5B, and 5C illustrate beam patterns generated using beam scheduling based on feedback information in a wireless communication system according to various embodiments of the disclosure.

Referring to FIG. 5A, in an 8-antenna-array switched beamforming system, the power transmitting device 100 may perform the beam scheduling based on a set of pre-defined single-lobe beam patterns. The 8-antenna-array switched beamforming system may include eight single-lobe beam patterns 510, and the eight single-lobe beam patterns 510 may be optimized in 90°, 45°, 0°, −45°, −90°, −135°, 180°, and 135° directions.

Referring to FIG. 5B, the power transmitting device 100 may combine the eight single-lobe beam patterns based on a beam scheduling result. The power transmitting device 100 may transmit the wireless power to the power requesting device based on arbitrary beam patterns 520 combined. The arbitrary beam patterns may be generated using an equal power (EQP) model or an asymmetric power (ASP) model. The EQP model selects a single lobe beam to use, and generates the beam by allocating the equal transmit power to the selected beam. The ASP model freely allocates the transmit power to the single-lobe beams.

Referring to FIG. 5C, a single-lobe beam pattern 530 using the EQP model selects 90° and −45° single-lobe beams and allocates the equal transmit power to the beams. A single-lobe beam pattern 540 using the ASP model selects 90° and −45° single-lobe beams and allocates asymmetric transmit powers.

Figure 6A:
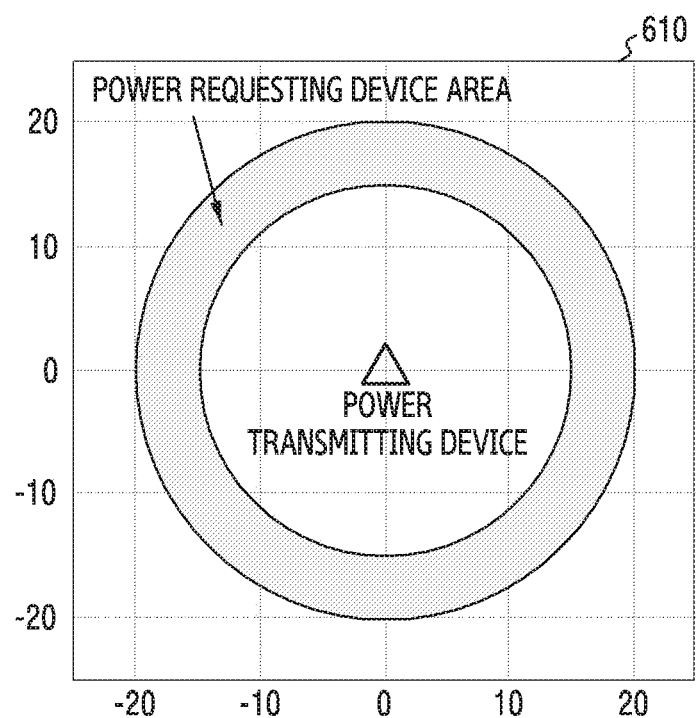
FIG. 6A illustrates test results using beam scheduling based on feedback information in a wireless communication system according to an embodiment of the disclosure.
Figure 6A:
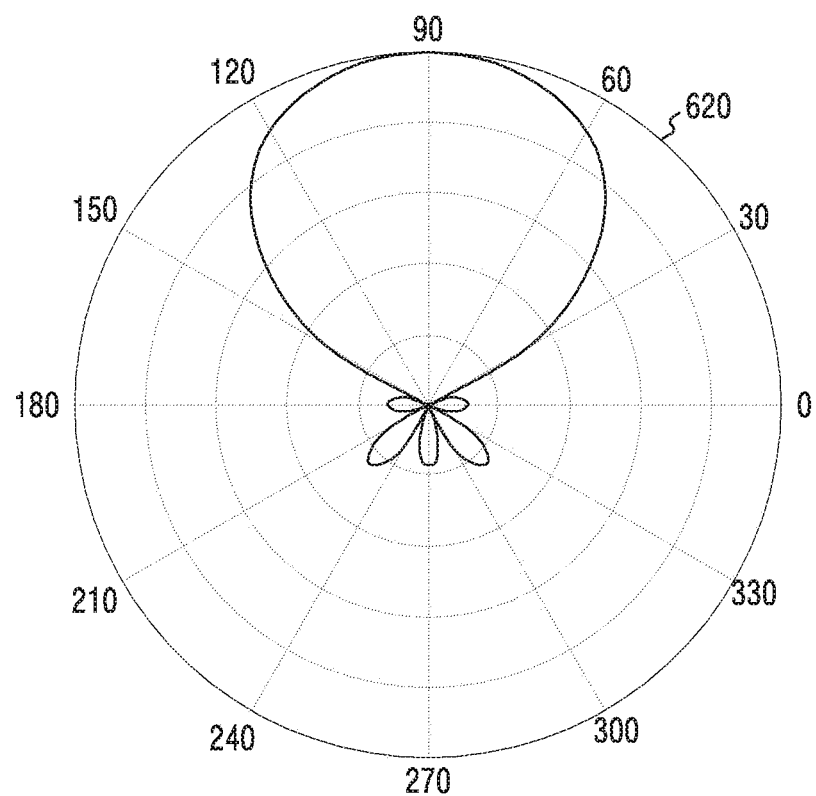
Figure 6B:
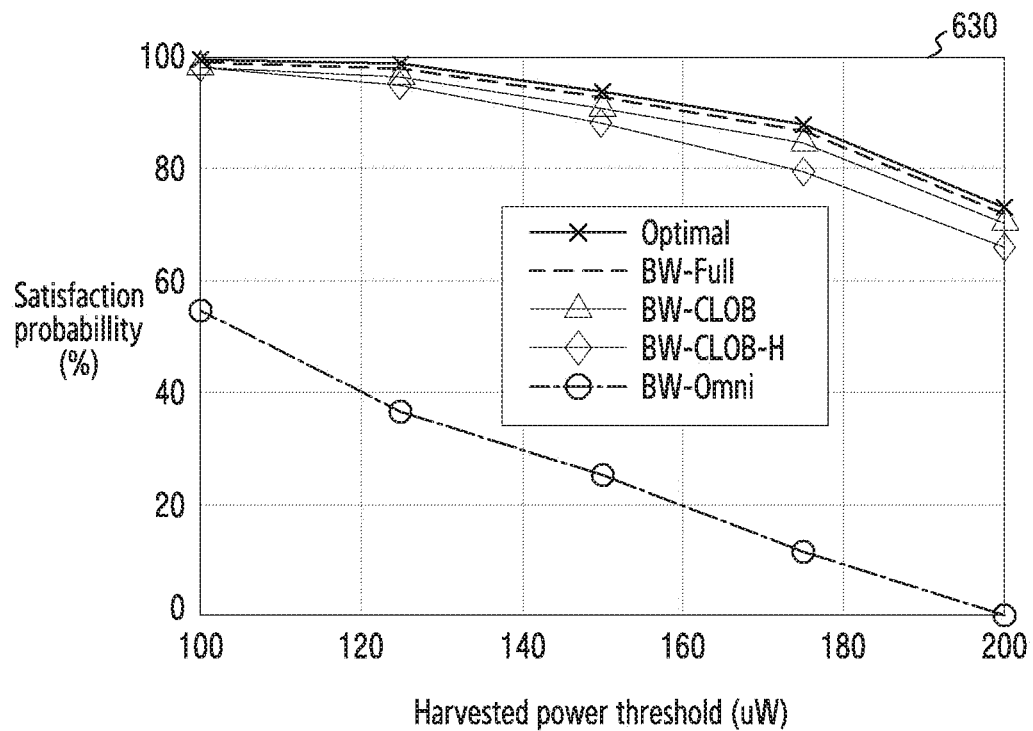
FIG. 6B further illustrates test results using beam scheduling based on feedback information in a wireless communication system according to an embodiment of the disclosure.
Figure 6B:
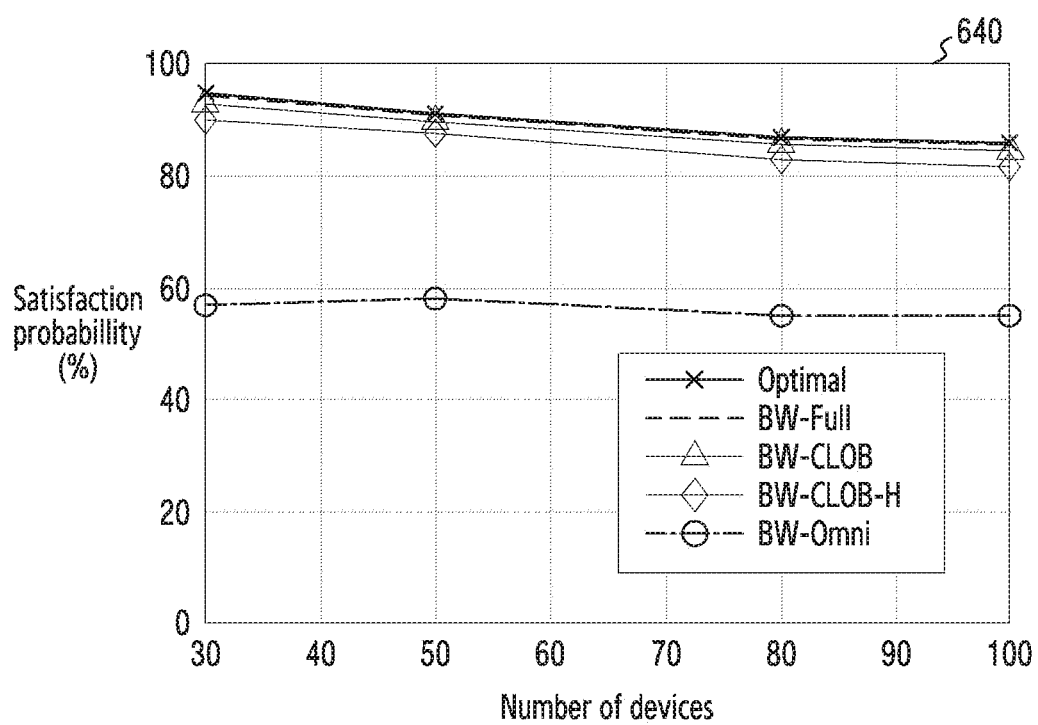

FIGS. 6A and 6B illustrate test results using beam scheduling based on feedback information in a wireless communication system according to various embodiments of the disclosure.

Referring to FIG. 6A, in an 8-antenna-array switched beamforming system, test topology 610 randomly distributes six power requesting devices over a concentric circle of 15~20 m from the power transmitting device. A single-lobe beam pattern 620 is an example of a beam pattern generated based on the beam scheduling. If the system operation mode is the first mode, the test is conducted by generating a test instance per topology, and using presence or absence of the power request of each power requesting device as the feature information. If the system operation mode is the second mode, the test is conducted by changing the position of the power requesting device in one test instance and using the receive power per beam pattern as the feature information. Herein, the transmit power of the power transmitting device may be 4 W, and the required power harvest of the power requesting device may be 100 uW. The present beam scheduling method, the optimal scheduling method, the scheduling method (BW-Full) using perfect channel information feedback, and the method (BW-Omni) using the omni beam pattern are compared in performance. For example, if a distance of the power transmitting device and the power requesting device is 15~20 m, test results are shown in Table 5.

TABLE 5

| | the satisfaction of the required power harvest (%) |
|---|---|
| Optimal | 99.6% |
| BW-Full | 99.1% |
| Proposed mode 1 | 98.2% |
| Proposed mode 2 | 92.6% |
| BW-Omni | 54.7% |

If the distance of the power transmitting device and the power requesting device is 20 m, test results are shown in Table 6.

TABLE 6

| | the satisfaction of the required power harvest (%) |
|---|---|
| Optimal | 83.5% |
| BW-Full | 82.1% |
| Proposed mode 1 | 81.2% |
| Proposed mode 2 | 78.5% |
| BW-Omni | 16.5% |

In the beam scheduling test based on the feedback information, if the system operation mode is the first mode, the test is iterated 1000 times per topology using the ASP model. If the system operation mode is the second mode, the test adopts the EQP model. In this test, a pathloss exponent is 3.76, the transmit power of the power transmitting device is 4 W, the required power harvest of the power requesting device is 100 uW, power conversion efficiency is 0.5, a maximum beamforming gain is 10 dB, and an omni-directional beamforming gain is 4 dB.

Referring to FIG. 6B, in a satisfaction probability graph 630 based on a harvested power threshold, the scheduling method (BW-CLOB and BW-CLOB-H) exhibits similar performance to the optimal scheduling method (Optimal) and the scheduling method (BW-Full) using the perfect channel information feedback. In a satisfaction probability graph 640 based on the number of devices, the scheduling method (BW-CLOB and BW-CLOB-H) exhibits similar performance to the optimal scheduling method (Optimal) and the scheduling method (BW-Full) using the perfect channel information feedback. Accordingly, the scheduling method may reduce overhead caused by the feedback information, lower the computational complexity, and exhibit the similar performance to a scheduling method of the related art.

An apparatus and a method according to various embodiments of the disclosure may perform the beam scheduling based on the feedback information corresponding to small volume, to thus reduce the overhead caused by the feedback information, lower the computational complexity, and exhibit the similar performance to a scheduling method of the related art.

The methods according to the embodiments described in the claims or the specification of the disclosure may be implemented in software, hardware, or a combination of hardware and software.

As for the software, a non-transitory computer-readable storage medium storing one or more programs (software modules) may be provided. The one or more programs stored in the computer-readable storage medium may be configured for execution by one or more processors of an electronic device. The one or more programs may further include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of such recording media. A plurality of memories may be equipped.

The program may be stored in an attachable storage device accessible via a communication network such as Internet, Intranet, LAN, wide LAN (WLAN), or storage area Network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a power transmitting device in a wireless communication system, the method comprising:
receiving power request signals from a plurality of electronic devices;
transmitting power to the plurality of the electronic devices based on the power request signals;
receiving feedback information corresponding to whether power harvest reaches a threshold value from the plurality of electronic devices;
updating beam scheduling based on the feedback information;
performing beam scheduling for maximizing power harvest satisfaction based on the feedback information and previous feedback information; and
transmitting power to the plurality of the electronic devices using at least one beam based on the performed beam scheduling, wherein the previous feedback information is information previously received from the plurality of the electronic devices before receiving the feedback information, and wherein the power harvest satisfaction is determined based on the number of electronic devices in which the power harvest reaches the threshold value.

2. The method of claim 1, wherein the transmitting power to the plurality of the electronic devices using at least one beam based on the performed beam scheduling further comprises:

transmitting power by using at least one beam to an electronic device in which the power harvest does not reach the threshold value among the plurality of electronic devices.

3. The method of claim 1, wherein the feedback information comprises information of the power harvest of each of the plurality of the electronic devices.

4. The method of claim 2, wherein the feedback information comprises 1 if power harvested by the electronic device exceeds the required power harvest, and wherein the feedback information comprises 0 if power harvested by the electronic device falls below the required power harvest.

5. The method of claim 1, further comprising:

receiving power request signals from the plurality of the electronic devices; and determining feature information based on the power request signals.

6. The method of claim 5, wherein the power request signal is a 1-bit power request signal using orthogonal resource per device of the plurality of the electronic devices.

7. The method of claim 5, wherein performing the beam scheduling based on the feedback information comprises performing the beam scheduling based on the feature information and the feedback information, and wherein the feature information comprises information of whether at least one of the plurality of the electronic devices requests the power, waveform information of a received signal for each beam, average power information of the received signal for each beam, or maximum power information of the received signal for each beam.

8. The method of claim 1, further comprising:

receiving connection information from the plurality of the electronic devices, wherein the connection information comprises identification information of at least one electronic device, security information, a required power harvest of the electronic device or specification information of the electronic device.

9. The method of claim 1, further comprising:

transmitting a system message to the plurality of the electronic devices; and receiving a response message of the system message, wherein the system message comprises at least one system operation mode information, radio resource frame information, power request signal resource information, power request transmission scheme information, feedback resource information or feedback information.

10. The method of claim 9, wherein the system operation mode comprises a first mode for a requesting device having no mobility and a second mode for a requesting device having mobility.

11. The method of claim 10, wherein the power transmitting device selectively operates in either the first mode or the second mode according to a situation.

12. The method of claim 10, wherein the power transmitting device is preset to either the first mode or the second mode.

13. The method of claim 10, further comprising changing to the first mode or the second mode based on the system operation mode information of the system information.

14. The method of claim 1, wherein performing the beam scheduling based on the feedback information comprises performing the beam scheduling through a beam scheduling engine based on the feedback information, and wherein the beam scheduling engine is implemented using a contextual multi-armed bandit scheme, reinforcement learning (RL), deep RL, a Q-learning scheme, a deep Q-learning scheme, a state-action-reward-state-state (Sarsa) scheme, or an actor-critic scheme.

15. A power transmitting device in a wireless communication system, the power transmitting device comprising:

a communication transceiver; and at least one processor coupled to the communication transceiver, wherein the at least one processor is configured to:

receive power request signals from a plurality of electronic devices, transmit power to the plurality of the electronic devices based on the power request signals, receive feedback information corresponding to whether power harvest reaches a threshold value from the plurality of electronic devices, update beam scheduling based on the feedback information, and perform beam scheduling for maximizing power harvest satisfaction based on the feedback information and previous feedback information, and transmit power to the plurality of the electronic devices using at least one beam based on the performed beam scheduling, wherein the previous feedback information is information previously received from the plurality of the electronic devices before receiving the feedback information, and wherein the power harvest satisfaction is determined based on the number of electronic devices in which the power harvest reaches the threshold value.

16. The power transmitting device of claim 15, wherein the at least one processor, in order to transmit power to the plurality of the electronic devices using at least one beam based on the performed beam scheduling, is further configured to:

transmit power by using at least one beam to an electronic device in which the power harvest does not reach the threshold value among the plurality of electronic devices.

17. The power transmitting device of claim 15, wherein the feedback information comprises information of the power harvest of each of the plurality of the electronic devices.

18. The power transmitting device of claim 15, wherein the at least one processor is further configured to:

receive power request signals from the plurality of the electronic devices, and determine feature information based on the power request signals.

19. The power transmitting device of claim 15,
wherein the at least one processor is further configured to receive connection information from the plurality of the electronic devices, and
wherein the connection information comprises identification information of at least one electronic device, security information, a required power harvest of the electronic device or specification information of the electronic device.

20. The power transmitting device of claim 15,
wherein the at least one processor is further configured to:
 transmit a system message to the plurality of the electronic devices; and
 receive a response message of the system message, and
wherein the system message comprises at least one system operation mode information, radio resource frame information, power request signal resource information, power request transmission scheme information, feedback resource information or feedback information.

* * * * *